US009098605B2

(12) United States Patent
Kitagawa

(10) Patent No.: US 9,098,605 B2
(45) Date of Patent: Aug. 4, 2015

(54) TEST SYSTEM, TEST METHOD, AND TEST DEVICE

(71) Applicant: ANRITSU CORPORATION, Kanagawa (JP)

(72) Inventor: Kazunori Kitagawa, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 217 days.

(21) Appl. No.: 13/933,664

(22) Filed: Jul. 2, 2013

(65) Prior Publication Data

US 2014/0082435 A1 Mar. 20, 2014

(30) Foreign Application Priority Data

Sep. 19, 2012 (JP) ................................. 2012-205136

(51) Int. Cl.
*G06F 11/32* (2006.01)
*H04W 24/08* (2009.01)

(52) U.S. Cl.
CPC ............. *G06F 11/327* (2013.01); *H04W 24/08* (2013.01)

(58) Field of Classification Search
CPC .... G06F 11/327; H04W 24/08; H04W 28/18; H04W 4/24; H04W 24/10; H04L 41/065; H04L 41/12; H04L 41/5035; H04L 41/66; H04L 63/08
See application file for complete search history.

(56) References Cited

U.S. PATENT DOCUMENTS

| 7,840,382 B2 * | 11/2010 | Avadhanam .................. 702/187 |
| 8,073,011 B2 | 12/2011 | Watanabe et al. |
| 8,441,939 B2 * | 5/2013 | Chang et al. .................. 370/241 |
| 2008/0091976 A1 * | 4/2008 | Avadhanam .................... 714/37 |
| 2011/0053513 A1 * | 3/2011 | Papakostas et al. .......... 455/63.1 |

FOREIGN PATENT DOCUMENTS

| JP | 10-320324 A | 4/1998 |
| JP | 2008-193314 A | 8/2008 |
| JP | 2009-147640 | 7/2009 |
| JP | 2010-219843 A | 9/2010 |

* cited by examiner

*Primary Examiner* — Nadeem Iqbal
(74) *Attorney, Agent, or Firm* — Pearne & Gordon LLP

(57) ABSTRACT

To prevent the complete omission of a log due to log information which is destroyed since it cannot be transmitted, when the communication log information of a plurality of layers is transmitted and a log is displayed at a transmission destination. A test device 10 includes a log header generating unit 151 that generates a log header including layer identification information and time information, a log data generating unit 152 that generates log data including communication data, a test-device-side transmitting unit 17 that transmits the log header and the log data to a display device 30, and a priority control unit 19 that performs control such that the log header is transmitted prior to the log data. A display control unit 35 of the display device 30 displays a log such that the log header is associated with the log data.

13 Claims, 10 Drawing Sheets

| No. | Log | PHY | MAC | RLC | PDCP | RRC | Primitive | BTS | Channel | | Message | Progress Time |
|---|---|---|---|---|---|---|---|---|---|---|---|---|
| 001 | ○ | | | | | ↓ | LTE_PDCP_DATA_REQ | 1 | LTE_DL_DTCH | 0 | RRC CONNECTION RECONFIGURATION | 000. 01. 13. 750 |
| 002 | ○ | | | | ↓ | | LTE_RLC_DATA_REQ | 1 | LTE_DL_DTCH | 0 | | 000. 01. 13. 760 |
| 003 | ○ | | | ↓ | | | LTE_MAC_DATA_REQ | 1 | LTE_DL_DTCH | 0 | | 000. 01. 13. 770 |
| 004 | ○ | | ↓ | | | | LTE_PHY_DATA_REQ | 1 | LTE_DL_SCH | 1 | | 000. 01. 13. 780 |
| 005 | ○ | | ↑ | | | | LTE_PHY_DATA_IND | 1 | LTE_UL_SCH | 0 | | 000. 01. 24. 500 |
| 006 | ○ | | | ↑ | | | LTE_MAC_DATA_IND | 1 | LTE_UL_DCCH | 0 | | 000. 01. 24. 510 |
| 007 | × | | | | ↑ | | LTE_RLC_DATA_IND | 1 | LTE_UL_DCCH | 0 | | 000. 01. 24. 520 |
| 008 | × | | | | | ↑ | LTE_PDCP_DATA_IND | 1 | LTE_UL_DCCH | 0 | | 000. 01. 24. 530 |

RRC
DL-DTCH-Message
└ message
  └ G1

| No. | Log | PHY | MAC | RLC | PDCP | RRC | Primitive | BTS | Channel | Message | Progress Time |
|---|---|---|---|---|---|---|---|---|---|---|---|
| 001 | O | | | | | ↓ | LTE_PDCP_DATA_REQ | 1 | LTE_DL_DTCH 0 | RRC CONNECTION RECONFIGURATION | 000. 01. 13. 750 |
| 002 | O | | | | ↓ | | LTE_RLC_DATA_REQ | 1 | LTE_DL_DTCH 0 | | 000. 01. 13. 760 |
| 003 | O | | | ↓ | | | LTE_MAC_DATA_REQ | 1 | LTE_DL_DTCH 0 | | 000. 01. 13. 770 |
| 004 | O | | ↓ | | | | LTE_PHY_DATA_REQ | 1 | LTE_DL_SCH 1 | | 000. 01. 13. 780 |
| 005 | O | | ↑ | | | | LTE_PHY_DATA_IND | 1 | LTE_UL_SCH 0 | | 000. 01. 24. 500 |
| 006 | O | | | ↑ | | | LTE_MAC_DATA_IND | 1 | LTE_UL_DCCH 0 | | 000. 01. 24. 510 |
| 007 | × | | | | ↑ | | LTE_RLC_DATA_IND | 1 | LTE_UL_DCCH 0 | | 000. 01. 24. 520 |
| 008 | × | | | | | ↑ | LTE_PDCP_DATA_IND | 1 | LTE_UL_DCCH 0 | | 000. 01. 24. 530 |

No Data

FIG. 5

TEST SYSTEM, TEST METHOD, AND TEST DEVICE

TECHNICAL FIELD

The present invention relates to a test system, a test method, and a test device which communicate with a mobile communication terminal, such as a mobile phone or a data communication terminal, in order to test whether the mobile communication terminal performs normal communication and display a communication log.

BACKGROUND ART

When a mobile communication terminal, such as a mobile phone or a data communication terminal, is newly developed, it is necessary to test whether the developed mobile communication terminal normally performs communication. Therefore, the following test is performed: a mobile communication terminal, which is a test target, is connected to a pseudo-base station apparatus which simulates the functions of the actual base station, communication is performed between the pseudo-base station apparatus and the mobile communication terminal, the pseudo-base station apparatus acquires a communication log and displays the log, and the tester checks the content of the log.

However, the communication protocol of the mobile communication is generally hierarchized (layered) and a different process is performed in each layer. Therefore, in the above-mentioned test, it is necessary to display the communication log for each layer and the pseudo-base station apparatus acquires log information which is data for the communication log for each layer.

In general, when the communication log is displayed, the log information acquired by the pseudo-base station apparatus is transmitted to a personal computer (PC) and a log display application which operates in the PC is used to display the log on the display screen of the PC, in order to improve the convenience of the tester. The pseudo-base station apparatus or the test device having these functions is disclosed in the following Patent Documents 1 and 2.

RELATED ART DOCUMENT

Patent Document

[Patent Document 1] JP-A-2009-147640
[Patent Document 2] JP-A-2010-219843

DISCLOSURE OF THE INVENTION

Problem that the Invention is to Solve

However, when the communication log is acquired for each layer, the amount of data of the log information is several times more than the amount of data of the actual communication. However, since the storage capacity of the pseudo-base station apparatus is limited, it is necessary to rapidly transmit the log information acquired by the pseudo-base station apparatus to the PC.

As a mobile communication system, a high-speed data communication system, such as LTE (Long Term Evolution) or WiMAX, has appeared and the difference between the data communication speed and the wired data communication speed between the pseudo-base station apparatus and the PC has been reduced. Therefore, the log information acquired by the pseudo-base station apparatus is not transmitted to the PC and is destroyed. As a result, the log is omitted during display and the tester cannot check the content of the communication, which makes it difficult to perform a sufficient test.

The invention has been made in view of the above-mentioned problems and an object of the invention is to provide a test system, a test method, and a test device capable of preventing the complete omission of a log due to log information which is destroyed since it cannot be transmitted when the communication log information is transmitted and a log is displayed at a transmission destination.

Means for Solving Problem

In order to achieve the object, according to a first aspect of the invention, a test system (1) includes: a test device (10) including a layer processing unit (12) that performs processes corresponding to a plurality of layers for a message which is transmitted and received to and from a mobile communication terminal (2), which is a test target, according to a communication protocol including the plurality of layers, a log processing unit (15) that acquires communication data for each layer from the layer processing unit and generates log information including the communication data, layer identification information for identifying a transmission source layer and a destination layer of the communication data, and time information indicating a time when the communication data is communicated, and a transmitting unit (17) that transmits the log information to the outside; and a display device (30) including a display unit (36) and a display control unit (35) that displays communication logs of the plurality of layers on the display unit on the basis of the log information received from the transmitting unit of the test device. The log processing unit includes a log header generating unit (151) that generates a log header including the layer identification information and the time information and a log data generating unit (152) that generates log data including the communication data, and the log processing unit generates the log header and the log data as the log information. The test device further includes a priority control unit (19) that performs control such that the transmitting unit transmits the log header prior to the log data. The display control unit displays the log such that the log header is associated with the log data.

According to a second aspect of the invention, in the test system according to the first aspect, the transmitting unit may include a transmission buffer (171) that temporarily stores transmission target data and deletes the stored transmission target data whenever the transmission is performed. The test device may further include a log data buffer (16) that temporarily stores the log data generated by the log data generating unit. The priority control unit may sequentially store the log header generated by the log header generating unit in the transmission buffer and store the log data stored in the log data buffer in a free space of the transmission buffer immediately before the transmission is performed.

According to a third aspect of the invention, in the test system according to the first aspect, the transmitting unit may include a transmission buffer (171) that temporarily stores transmission target data and deletes the stored transmission target data whenever the transmission is performed. The test device may further include a log header buffer (18) that temporarily stores the log header generated by the log header generating unit and a log data buffer (16) that temporarily stores the log data generated by the log data generating unit. The priority control unit may store the log data stored in the log data buffer in a free space of the transmission buffer after storing the log header stored in the log header buffer in the transmission buffer.

According to a fourth aspect of the invention, in the test system according to the first aspect, the log processing unit may include an ID generating unit (154) that generates an identifier for identifying each log information item and outputs the same identifier to the log header generating unit and the log data generating unit. The log header generating unit may generate the log header including the identifier. The log data generating unit may generate the log data including the identifier. The display control unit may include a log correspondence processing unit (351) that associates the log header and the log data with the same identifier.

According to a fifth aspect of the invention, in the test system according to the first aspect, a display screen displayed on the display unit may include a log header information display area (60) in which information included in the log header is displayed as a log in time series and a communication data information display area (70) in which the content of the communication data included in the log data is displayed. When any one of the logs displayed in the log header information display area is designated, the display control unit may display the content of the communication data included in the log data corresponding to the designated log in the communication data information display area.

According to a sixth aspect of the invention, in the test system according to the first aspect, when the log header and the log data corresponding to each other are received from the transmitting unit of the test device, the display control unit may display the log such that the log header is associated with the log data. When only the log header is received from the transmitting unit of the test device, the display control unit may display the log on the basis of information included in the log header.

According to a seventh aspect of the invention, a test method includes: a layer processing step (S1) of performing processes corresponding to a plurality of layers for a message which is transmitted and received to and from a mobile communication terminal (2), which is a test target, according to a communication protocol including the plurality of layers; a log processing step of acquiring communication data for each layer which is processed in the layer processing step and generating log information including the communication data, layer identification information for identifying a transmission source layer and a destination layer of the communication data, and time information indicating a time when the communication data is communicated; a transmitting step (S13) of transmitting the log information; and a display step of displaying communication logs of the plurality of layers on the basis of the transmitted log information. The log processing step includes a log header generating step (S3) of generating a log header including the layer identification information and the time information and a log data generating step (S4) of generating log data including the communication data, and the log processing step generates the log header and the log data as the log information. The transmitting step transmits the log header prior to the log data. The display step displays the log such that the log header is associated with the log data.

According to an eighth aspect of the invention, in the test method according to the seventh aspect, the transmitting step may temporarily store transmission target data in a transmission buffer (171) and delete the stored transmission target data whenever the transmission is performed. The test method may further include: a log header storage step (S5) of sequentially storing the log header generated in the log header generating step in the transmission buffer; a first log data storage step (S7) of temporarily storing the log data generated in the log data generating step in a log data buffer (16); and a second log data storage step (S8) of storing the log data stored in the log data buffer in a free space of the transmission buffer immediately before the transmission is performed.

According to a ninth aspect of the invention, in the test method according to the seventh aspect, the transmitting step may temporarily store transmission target data in a transmission buffer (171) and delete the stored transmission target data whenever the transmission is performed. The test method may further include: a first log header storage step (S51) of storing the log header generated in the log header generating step in a log header buffer (18); a first log data storage step (S7) of temporarily storing the log data generated in the log data generating step in a log data buffer (16); a second log header storage step (S52) of storing the log header stored in the log header buffer in the transmission buffer; and a second log data storage step (S8) of storing the log data stored in the log data buffer in a free space of the transmission buffer after the second log header storage step.

According to a tenth aspect of the invention, in the test method according to the seventh aspect, the log processing step may include an ID generating step (S3) of generating an identifier which identifies each log information item and is the same in the log header generating step and the log data generating step. The log header generating step may generate the log header including the identifier. The log data generating step may generate the log data including the identifier. The display step may include a log correspondence processing step (S25) of associating the log header and the log data with the same identifier.

According to an eleventh aspect of the invention, in the test method according to the seventh aspect, a display screen displayed in the display step may include a log header information display area (60) in which information included in the log header is displayed as a log in time series and a communication data information display area (70) in which the content of the communication data included in the log data is displayed. The display step may include a designation step (S28) of designating any one of the logs displayed in the log header information display area and a communication data information display step (S30) of displaying the content of the communication data included in the log data corresponding to the designated log in the communication data information display area.

According to a twelfth aspect of the invention, in the test method according to the seventh aspect, when the log header and the log data corresponding to each other are transmitted in the transmitting step, the display step may display the log such that the log header is associated with the log data. When only the log header is transmitted in the transmitting step, the display step may display the log on the basis of information included in the log header.

According to a thirteenth aspect of the invention, a test device (10) includes: a layer processing unit (12) that performs processes corresponding to a plurality of layers for a message which is transmitted and received to and from a mobile communication terminal (2), which is a test target, according to a communication protocol including the plurality of layers; a log processing unit (15) that acquires communication data for each layer from the layer processing unit and generates log information including the communication data, layer identification information for identifying a transmission source layer and a destination layer of the communication data, and time information indicating a time when the communication data is communicated; a transmitting unit (17) that transmits the log information to a display device which displays communication logs of the plurality of layers on the basis of the log information; and a priority control unit (19).

The log processing unit includes a log header generating unit (151) that generates a log header including the layer identification information and the time information and a log data generating unit (152) that generates log data including the communication data, and the log processing unit generates the log header and the log data as the log information. The priority control unit performs control such that the transmitting unit transmits the log header prior to the log data.

Advantage of the Invention

The test system, the test method, and the test device according to the invention generate the log information divided into the log header and the log data and transmit the log header prior to the log data. Therefore, it is possible to display a log for information included in at least the log header. As a result, it is possible to prevent the complete omission of the log and improve the convenience of the tester in the test for the mobile communication terminal.

BRIEF DESCRIPTION OF THE DRAWINGS

FIG. 4 is a diagram illustrating an example of a display screen according to the embodiment of the invention.
FIG. 5 is a diagram illustrating another example of the display screen according to the embodiment of the invention.

BEST MODE FOR CARRYING OUT THE INVENTION

First Embodiment

Figure 1:
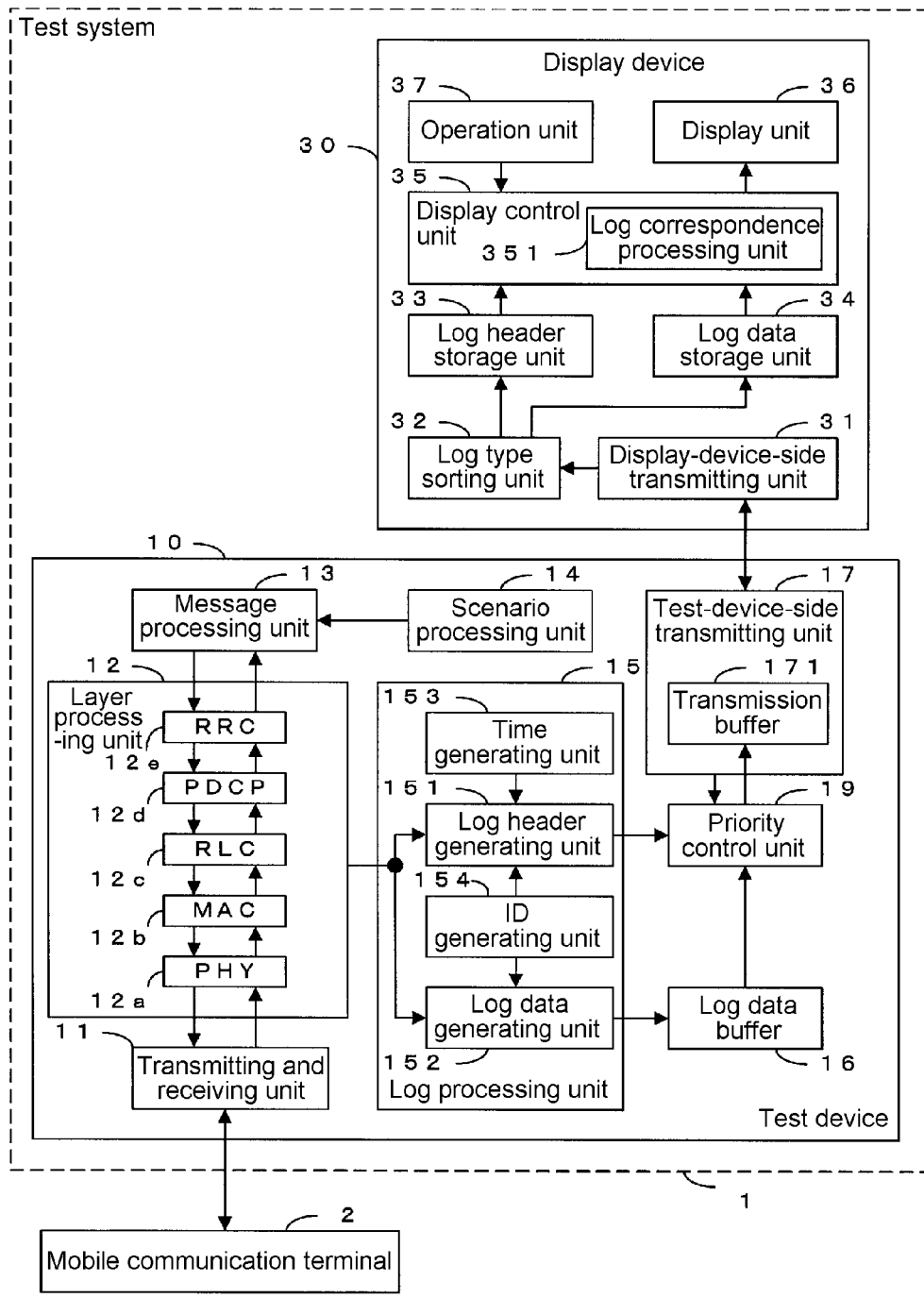
FIG. 1 is a block diagram illustrating a test system according to a first embodiment of the invention.

Hereinafter, a first embodiment of the invention will be described in detail with reference to the accompanying drawings. FIG. 1 is a block diagram illustrating a test system 1. The test system 1 tests a mobile communication terminal 2 such as a mobile phone or a data communication terminal which performs wireless communication based on a predetermined communication standard (for example, LTE or WiMAX). The test system 1 includes a test device 10 which communicates with the mobile communication terminal 2, generates log information about the communication, and transmits the log information and a display device 30 which displays a communication log using the log information transmitted from the test device 10. The test device 10 and the display device 30 are connected to each other by, for example, GbE (Gigabit Ethernet).

The test device 10 operates as a pseudo-base station according to a test scenario in which a communication sequence for a test and the operation sequence of each unit of the test device are described. The test device 10 includes a transmitting and receiving unit 11, a layer processing unit 12, a message processing unit 13, a scenario processing unit 14, a log processing unit 15, a log data buffer 16, a test-device-side transmitting unit 17, and a priority control unit 19.

The transmitting and receiving unit 11 performs encoding, modulation, and frequency conversion for communication data from the layer processing unit 12 to generate RF signals and transmits the RF signals to the mobile communication terminal 2. In addition, the transmitting and receiving unit 11 receives RF signals from the mobile communication terminal 2, performs frequency conversion, demodulation, and decoding for the received RF signals, and outputs the processed signals to the layer processing unit 12.

The layer processing unit 12 is configured so as to process the communication protocol of each layer according to a predetermined communication standard. The layer processing unit 12 processes the communication data from the transmitting and receiving unit 11 and transmits the processed communication data to the message processing unit 13. In addition, the layer processing unit 12 processes a message from the message processing unit 13 and transmits the processed message to the transmitting and receiving unit 11. At that time, whenever processing is performed in each layer, the layer processing unit 12 outputs communication data which is the content of the communication between the layers. The layer processing unit 12 includes a PHY processing unit 12a, a MAC processing unit 12b, an RLC processing unit 12c, a PDCP processing unit 12d, and an RRC processing unit 12e corresponding to the processing of each layer.

The message processing unit 13 generates the message to be transmitted to the mobile communication terminal 2, transmits the message to the layer processing unit 12, and processes the message which is received from the mobile communication terminal 2 through the layer processing unit 12, under the control of the scenario processing unit 14.

Although not shown in the drawings, the test device 10 may include a plurality of sets of the transmitting and receiving units 11, the layer processing units 12, and the message processing units 13. A set of the transmitting and receiving unit 11, the layer processing unit 12, and the message processing unit 13 simulates the operation of one base station. Therefore, when the test device 10 includes a plurality of sets of the transmitting and receiving units 11, the layer processing units 12, and the message processing units 13, for example, one test device 10 can test a handover operation of handing over a mobile communication terminal to the base station which is a communication destination.

The scenario processing unit 14 controls each unit of the test device 10 including the message processing unit 13 according to a test scenario which is stored in a storage unit (not shown) in advance.

The log processing unit 15 includes a log header generating unit 151 which generates a log header from the communication data output from the layer processing unit 12, a log data generating unit 152 which generates log data from the communication data output from the layer processing unit 12, a time generating unit 153 which generates time information, which is the actual time or the time elapsed from the start of the test and outputs the time information to the log header generating unit 151, and an ID generating unit 154 which generates a serial number from the start of the test as an identifier (ID) for identifying each log and outputs the serial number to the log header generating unit 151 and the log data generating unit 152.

Figure 2:
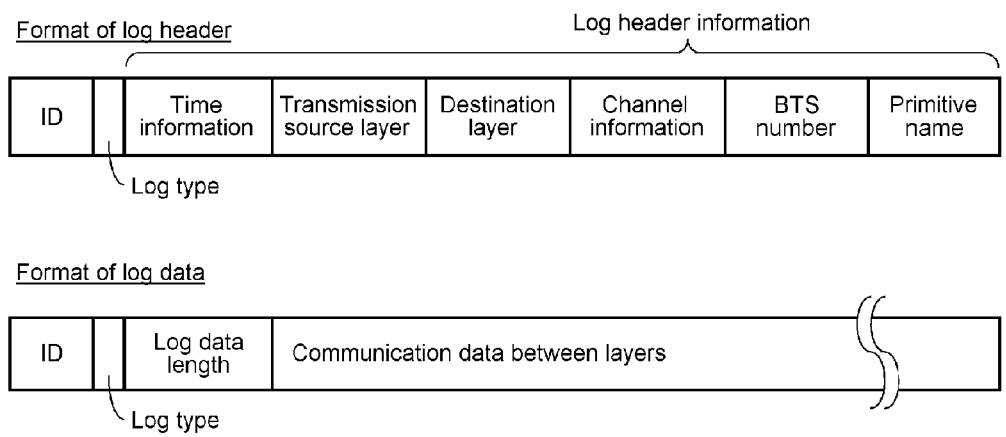
FIG. 2 is a diagram illustrating the format of a log header and log data according to the embodiment of the invention.

FIG. 2 shows the format of the log header generated by the log header generating unit 151 and the format of the log data generated by the log data generating unit 152.

Information included in the log header includes the ID generated by the ID generating unit 154, a log type indicating whether the data is a log header, the time information generated by the time generating unit 153, a transmission source layer indicating the transmission source of communication data, a destination layer indicating the destination of communication data, channel information indicating the channel type of communication data, BTS numbers for identifying a plurality of layer processing units 12 which are included in the test device 10 in order to simulate a plurality of base stations, and a primitive name indicating a primitive which is a command to set communication data. The time information, the transmission source layer, the destination layer, the channel information, the BTS number, and the primitive name are called log header information.

Among the information items, the log type is information which is included as a fixed value in the log header generating unit 151 in advance. The log header generating unit 151 acquires the transmission source layer, the destination layer, the channel information, the BTS number, and the primitive name using any one of the following methods: a method in which the log processing unit 15 identifies the transmission source of the communication data; a method in which the log processing unit 15 analyzes the received communication data; and a method in which the layer processing unit 12 transmits and receives the communication data and these information items.

Information included in the log data includes the ID generated by the ID generating unit 154, a log type indicating whether the data is log data, a log data length indicating the length of the log data, and communication data between the layers which is output from the layer processing unit 12. Among the information items, the log type is information which is included as a fixed value in the log data generating unit in advance and is different from that generated by the log header generating unit. The log data length is variable since the length of the communication data is variable. Therefore, the log data length is determined and inserted for the subsequent process when the log data generating unit 152 generates the log data.

The log header and the log data are combined with each other to form log information. The same ID is given to the log header and the log data which are generated from one communication data item in order to identify the correspondence between the log header and the log data in the subsequent process. In general, the amount of data of the log header is significantly less than the amount of communication data.

The log data buffer 16 temporarily stores the log data generated by the log data generating unit 152 and outputs the log data to the priority control unit 19 in chronological order. The log data output to the priority control unit 19 is deleted from the log data buffer 16. When the log data buffer 16 is in a full state in which there is no free space, the log data is deleted in chronological order or the storage of the log data is stopped until a free space is formed. That is, when the log data is deleted in chronological order, the log data is destroyed at the output of the log data buffer 16. When the storage of the log data is stopped until a free space is formed, the log data is destroyed at the output of the log data generating unit 152.

The test-device-side transmitting unit 17 includes a transmission buffer 171, receives the log header generated by the log header generating unit 151 and the log data stored in the log data buffer 16 through the priority control unit 19, and transmits the log header and the log data to the display device 30. As described above, for example, GbE is used as an interface for the display device 30 in the test-device-side transmitting unit 17. In this embodiment, data is transmitted at a predetermined time interval (for example, every 1 ms). However, data may be transmitted at odd intervals.

The transmission buffer 171 has storage capacity corresponding to the amount of data which can be transmitted by one transmission operation and temporarily stores transmission target data. After data is transmitted, the data stored in the transmission buffer 171 is deleted since the data has been transmitted.

The priority control unit 19 sequentially stores the log header generated by the log header generating unit 151 in the transmission buffer 171 and stores the log data stored in the log data buffer 16 in the free space of the transmission buffer 171 immediately before the log data is transmitted. When receiving a notice indicating the completion of transmission from the test-device-side transmitting unit 17, that is, when receiving a notice indicating the deletion of the data stored in the transmission buffer 171, the priority control unit 19 sequentially stores the log header in the transmission buffer 171 again. The priority control unit 19 repeatedly performs the series of control processes.

Figure 3:
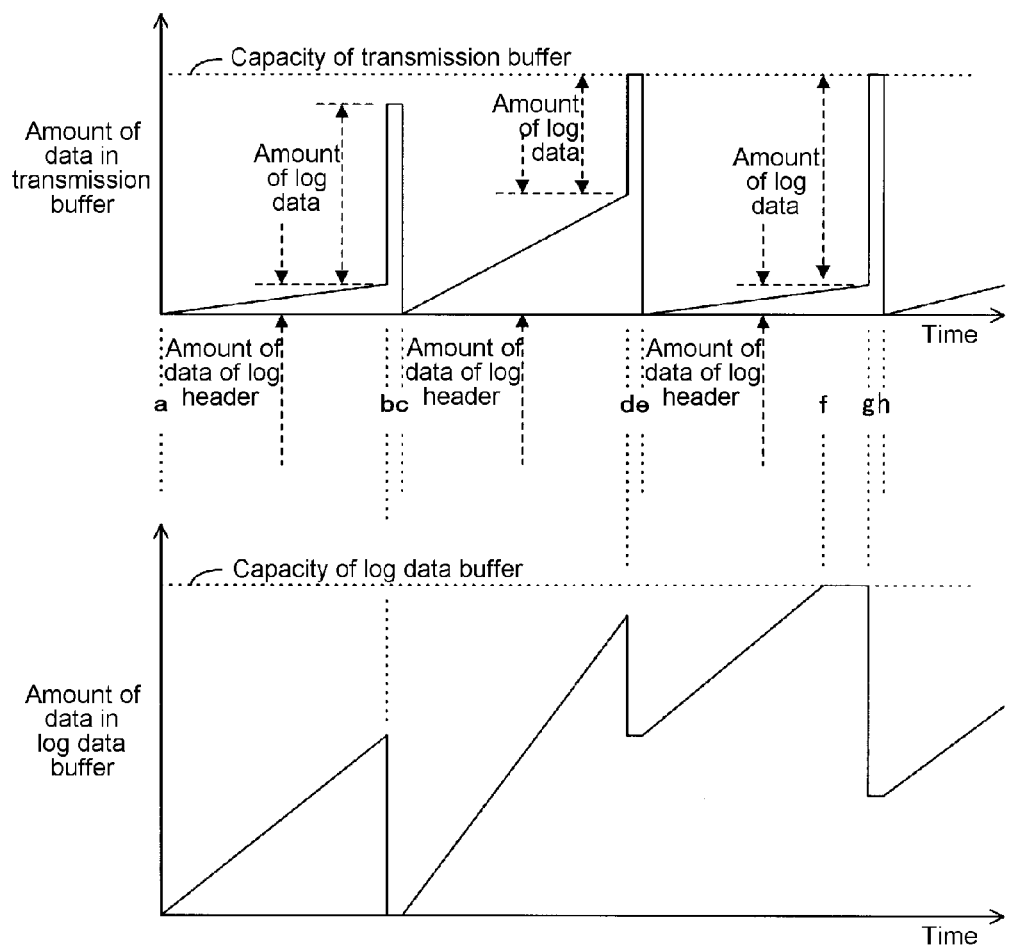
FIG. 3 is a diagram illustrating a change in the amount of data over time in the first embodiment of the invention.

FIG. 3 shows an example of a change in the amount of data in the transmission buffer 171 and the amount of data in the log data buffer 16 over time. Communication between the test device 10 and the mobile communication terminal 2 starts (time a). Then, the log header is generated and is sequentially stored in the transmission buffer 171 and the log data is generated and stored in the log data buffer 16. Immediately before transmission, the log data stored in the log data buffer 16 is stored in the free space of the transmission buffer 171 (time b). In this case, since the amount of log data stored in the log data buffer 16 is less than the free space of the transmission buffer 171, all of the log data is stored in the transmission buffer 171 and the amount of data in the log data buffer 16 is zero. Then, the log header and the log data stored in the transmission buffer 171 are transmitted and the amount of data in the transmission buffer 171 is zero (time c). The log header is not destroyed for the period from the storage of the log data in the transmission buffer 171 to the time when the amount of data in the transmission buffer 171 is zero (for example, for the period from the time b to the time c).

Since the communication between the test device 10 and the mobile communication terminal 2 is maintained, the log header and the log data are continuously stored. The amount of log header and log data is changed due to a change in the amount of communication and the content of the communication. Immediately before the next transmission, the log data stored in the log data buffer 16 is stored in the free space of the transmission buffer 171. In this case, since the amount of data stored in the log data buffer 16 is more than the free space of the transmission buffer 171, a portion of the log data is stored in the transmission buffer 171 and the amount of data in the log data buffer 16 is not zero (time d). Then, the log data is transmitted and the amount of data in the transmission buffer 171 is zero (time e).

The log header and the log data are continuously stored and the log data buffer 16 is full before the next transmission (time f). In this case, immediately before the next transmission, the buffer full state is maintained until the log data is stored in the free space of the transmission buffer 171 (time g), and the log data is destroyed in the test device 10. In this way, the log header is transmitted prior to the log data.

Returning to FIG. 1, the display device 30 is, for example, a personal computer (PC). The display device 30 includes a display-device-side transmitting unit 31, a log type sorting unit 32, a log header storage unit 33, a log data storage unit 34, a display control unit 35, a display unit 36, and an operation unit 37.

The display-device-side transmitting unit 31 transmits the log header and the log data transmitted from the test-device-side transmitting unit 17 to the log type sorting unit 32. As described above, for example, GbE is used as an interface for the test device 10 in the display-device-side transmitting unit 31.

The log type sorting unit 32 checks and sorts values indicating the log types of the log header and the log data, transmits the log header to the log header storage unit 33, and transmits the log data to the log data storage unit 34.

The log header storage unit 33 and the log data storage unit 34 are each a high-capacity storage medium, such as an HDD (hard disk drive) or a flash memory. The log header storage unit 33 stores the log header and the log data storage unit 34 stores the log data.

The display control unit 35 includes a log correspondence processing unit 351, reads the log header and the log data from the log header storage unit 33 and the log data storage unit 34, generates a display screen 50 for displaying a log, and displays the log on the display unit 36. The log correspondence processing unit 351 checks whether the log data corresponding to the log header stored in the log header storage unit 33 is stored in the log data storage unit 34 with reference to the ID.

FIG. 4 shows a display example of the display screen 50. The display screen 50 includes a log header information display area 60 in which the log header information included in the log header is displayed in time series, a communication data information display area 70 in which information about the communication data included in the log data is displayed, a message name display portion 80 in which the message name of the communication data included in the log data is displayed, and a communication data identification information display portion 90 in which whether there is communication data (that is, there is log data) corresponding to the displayed log is determined and displayed.

The log header information display area 60 includes a log number display portion 61 in which an ID, which is a log serial number, is displayed, a layer display portion 62 for identifying the log of a layer or the log of an uplink or a downlink using the display of an arrow, a primitive display portion 63 in which a command to set each layer is displayed, a BTS display portion 64 in which BTS numbers for identifying the layer processing units 12 when there are a plurality of layer processing units 12, a channel display portion 65 in which channel information is displayed, and a time display portion 66 in which time information is displayed.

The communication data information display area 70 includes a text display portion 71 in which the content of communication is converted into text and the text is displayed and a binary display portion 72 in which the content of communication is displayed with a binary Hex value. In this embodiment, when the log data storage unit 34 stores log data corresponding to the log which is designated by the tester through the operation unit 37 among a plurality of logs which are displayed in time series in the log header information display area 60 (or the message name display portion 80), the content of the communication is displayed in the text display portion 71 and the binary display portion 72. FIG. 4 shows a state in which a log with No. 001 is designated, in which a row with No. 001 is colored and displayed so as to be recognized and the content of communication data is displayed in the text display portion 71 and the binary display portion 72.

When the log data corresponding to the designated log is not stored in the log data storage unit 34, the communication data information display area 70 is blank or information indicating that there is no log data is displayed in the communication data information display area 70. FIG. 5 shows a state in which a log with No. 008 is designated, in which a row with No. 008 is colored and is displayed to be recognized. Since there is no log data corresponding to the log with No. 008, 'No Data' indicating that it is difficult to display the content of communication data since there is no log data is displayed in the text display portion 71 and the binary display portion 72 is blank.

The display control unit 35 analyzes the communication data included in the corresponding log data to acquire the message name of the communication data and displays the message name in the message name display portion 80. In FIGS. 4 and 5, the message name is displayed only for the log with No. 001 related to an RRC layer which is the highest layer. However, the message name may be displayed for each log (logs with Nos. 002 to 006) which includes the corresponding log data and is related to the layers other than a specific layer. When there is no corresponding log data in the log data storage unit 34 (logs with Nos. 007 and 008), the message name field is blank.

Next, the communication data identification information display portion 90 will be described. When the log data corresponding to the displayed log is stored in the log data storage unit 34, the log is displayed by a symbol "O" in the communication data identification information display portion 90. When the log data corresponding to the displayed log is not stored in the log data storage unit 34, the log is displayed by a symbol "X" in the communication data identification information display portion 90. Therefore, the tester can check whether there is log data for a log (that is, whether there is communication data).

Figure 6:
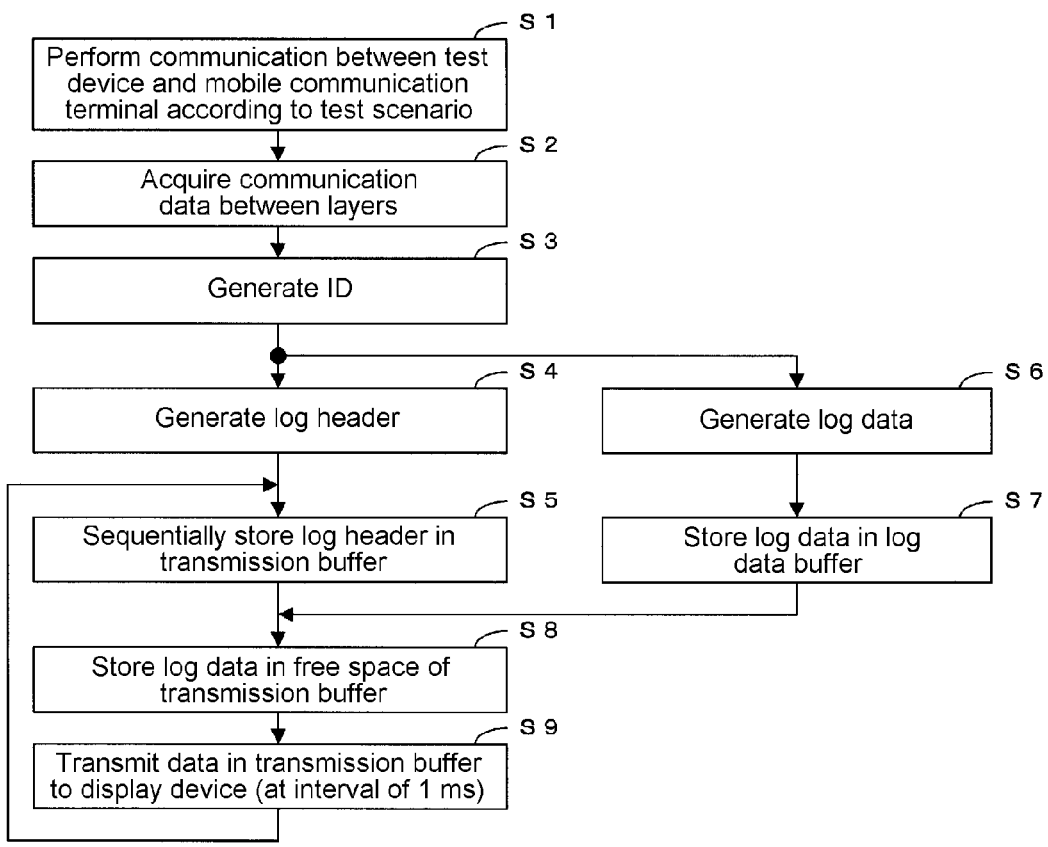
FIG. 6 is a flowchart illustrating the operation of a test device according to the first embodiment of the invention.
Figure 7:
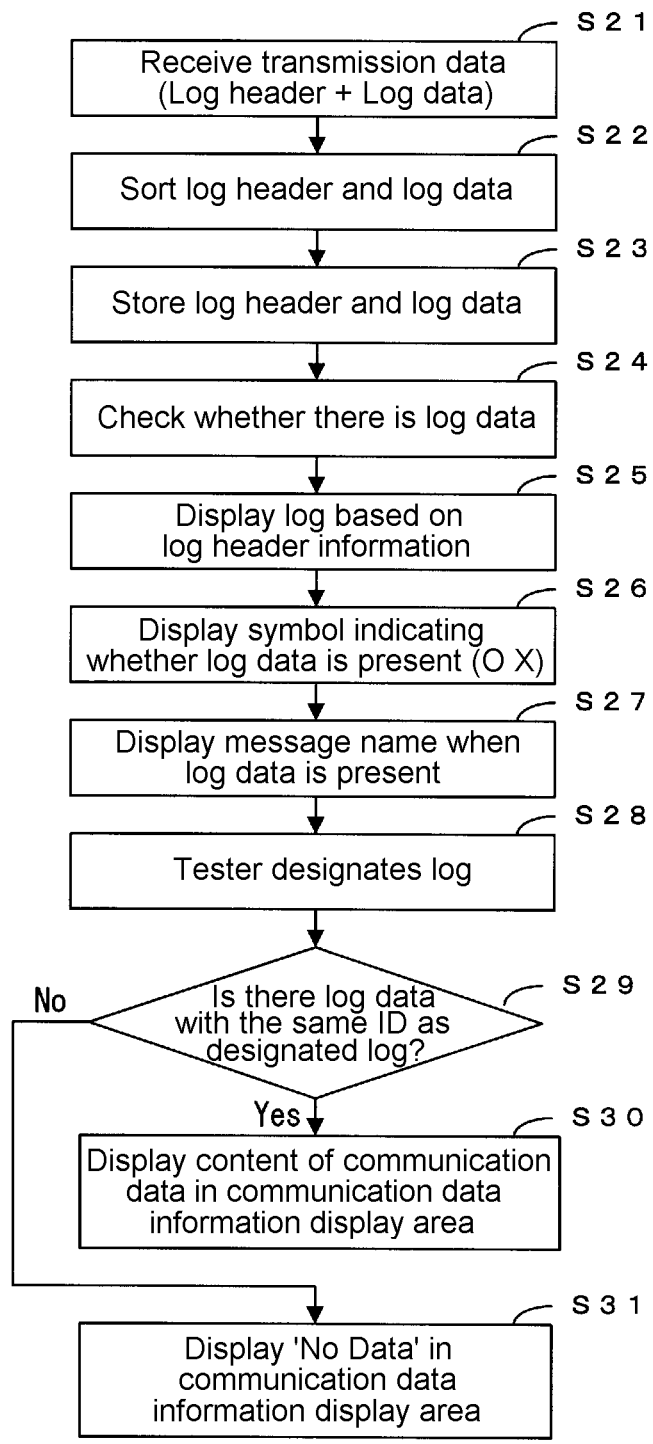
FIG. 7 is a flowchart illustrating the operation of the display device according to the embodiment of the invention.

Next, the operation of the test system 1 will be described with reference to the drawings. FIG. 6 is a flowchart illustrating the operation of the test device 10 and FIG. 7 is a flowchart illustrating the operation of the display device 30.

When the test is instructed to start, the scenario processing unit 14 controls the message processing unit 13 according to the test scenario and communicates with the mobile communication terminal 2 through the layer processing unit 12 and the transmitting and receiving unit (S1). Then, the log processing unit 15 acquires communication data in each layer during the communication from the layer processing unit 12 (S2). Whenever the communication data is acquired, the ID generating unit 154 generates an ID and outputs the ID to the log header generating unit 151 and the log data generating unit 152 (S3).

The log header generating unit 151 generates a log header using the ID, the log type, and the log header information (S4). The priority control unit 19 sequentially stores the generated log header in the transmission buffer 171 (S5). At the same time, the log data generating unit 152 generates log data using the ID, the log type, the log data length, and the communication data (S6). The generated log data is stored in the log data buffer 16 (S7).

The test-device-side transmitting unit 17 transmits the data stored in the transmission buffer 171 to the display device 30. Immediately before the data is transmitted, the priority control unit 19 stores the log data stored in the log data buffer 16 in the free space of the transmission buffer 171 (S8). This transmission is repeatedly performed at an interval of, for example, 1 ms (S9).

In the display device 30, the display-device-side transmitting unit 31 receives transmission data including the log header and the log data from the test-device-side transmitting unit 17 and outputs the transmission data to the log type sorting unit 32 (S21). The log type sorting unit 32 checks the values of the log types of the log header and the log data and sorts the log header and the log data (S22). Then, the log header is stored in the log header storage unit 33 and the log data is stored in the log data storage unit 34 (S23).

The display control unit 35 reads the log header from the log header storage unit 33. The log correspondence processing unit 351 checks whether the log data with the same ID is stored in the log data storage unit 34 for each of the read log headers (S24).

The display control unit 35 displays the log on the display screen 50 of the display unit 36 on the basis of the log header information of each of the read log headers (S25). When the log is displayed, each log header information item is arranged in the order of IDs (or in the order of time information). In addition, the display control unit 35 determines whether there is communication data corresponding to the displayed log (that is, whether there is log data) on the basis of the check result of the log correspondence processing unit 351 and displays information indicating the determination result in the communication data identification information display portion 90 (S26). When the log data corresponding to each displayed log is stored in the log data storage unit 34, the display control unit 35 analyzes the communication data included in the log data and displays the message name of the communication data in the message name display portion (S27).

When the tester designates a log through the operation unit 37 (S28) and the corresponding log data is stored in the log data storage unit 34 (S29—Yes), the display control unit 35 reads the corresponding log data from the log data storage unit 34 and displays the content of the communication data in the communication data information display area 70 (S30). When the corresponding log data is not stored in the log data storage unit 34 (S29—No), the display control unit 35 displays 'No Data' in the text display portion 71 of the communication data information display area 70 (S31).

Second Embodiment

Figure 8:
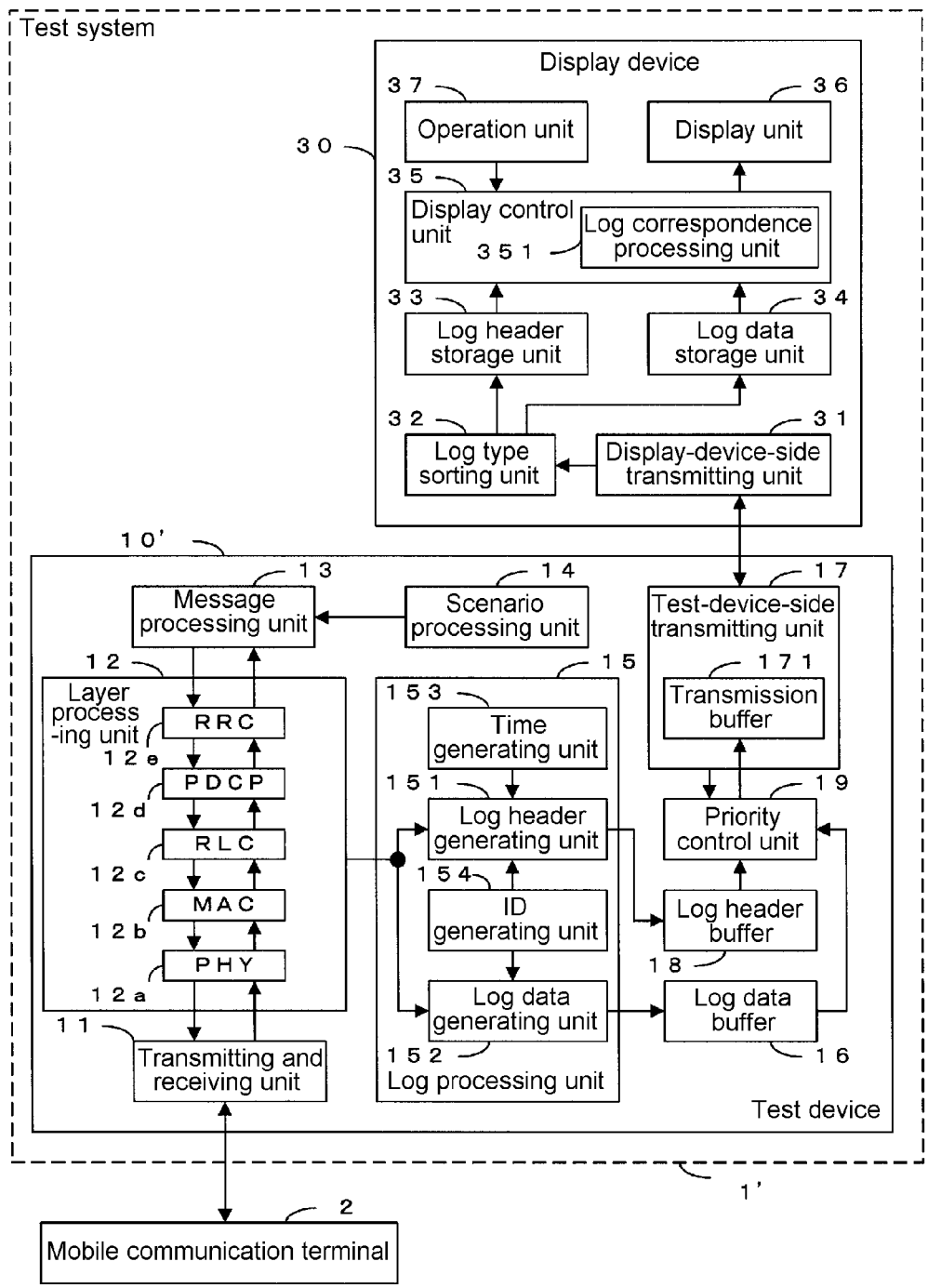
FIG. 8 is a block diagram illustrating a test system according to a second embodiment of the invention.

Next, a second embodiment of the invention will be described. In the second embodiment, functional blocks or processes with the same functions as those in the first embodiment are denoted by the same reference numerals in the drawings and the description thereof will not be repeated. FIG. 8 is a block diagram illustrating a test system 1' and differs from the block diagram of FIG. 1 illustrating the test system 1 in that a test device 10' includes a log header buffer 18.

The log header buffer 18 temporarily stores a log header generated by a log header generating unit 151 and outputs the log header to a priority control unit 19 in chronological order. The log header output to the priority control unit 19 is deleted from the log header buffer 18.

Whenever, data is transmitted, the priority control unit 19 performs control such that all of the log headers stored in the log header buffer 18 are stored in a transmission buffer 171 and the log data stores in a log data buffer 16 is stored in the free space of the transmission buffer 171. After data is transmitted, the data stored in the transmission buffer 171 is deleted since the data has been transmitted.

Figure 9:
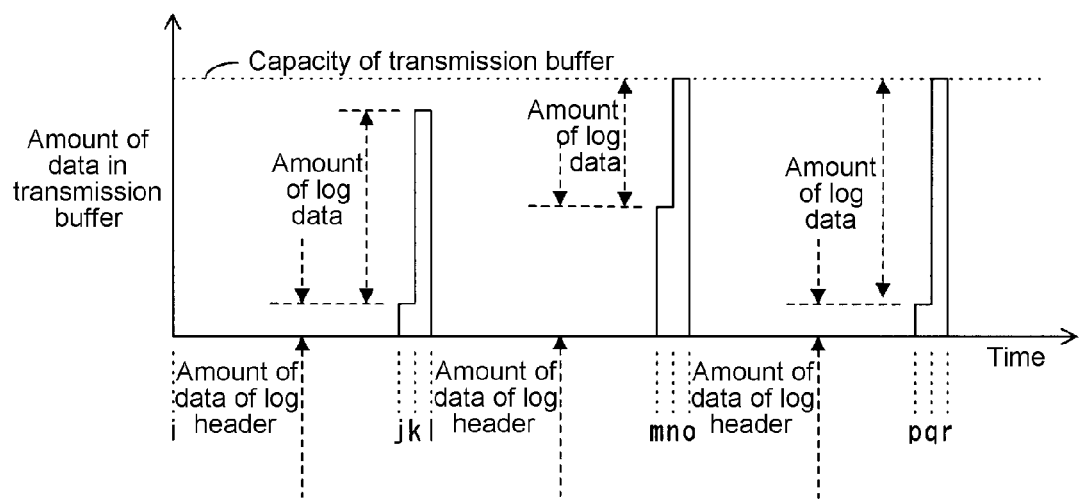
FIG. 9 is a diagram illustrating a change in the amount of data over time in the second embodiment of the invention.

FIG. 9 shows an example of a change in the amount of data in the transmission buffer 171 over time. The communication between the test device 10' and a mobile communication terminal 2 starts (time i). Then, a log header is generated and stored in the log header buffer 18 and log data is generated and stored in the log data buffer 16. Before transmission is performed, first, all of the log headers stored in the log header buffer 18 are stored in the transmission buffer 171 (times j, m, and p). Then, the log data stored in the log data buffer 16 is stored in the free space of the transmission buffer 171 (times k, n, and q). Then, the log headers and the log data stored in the transmission buffer 171 are transmitted and the amount of data in the transmission buffer 171 is zero (times l, o, and r). These operations are repeated whenever transmission is performed and the log header is transmitted prior to the log data.

Figure 10:
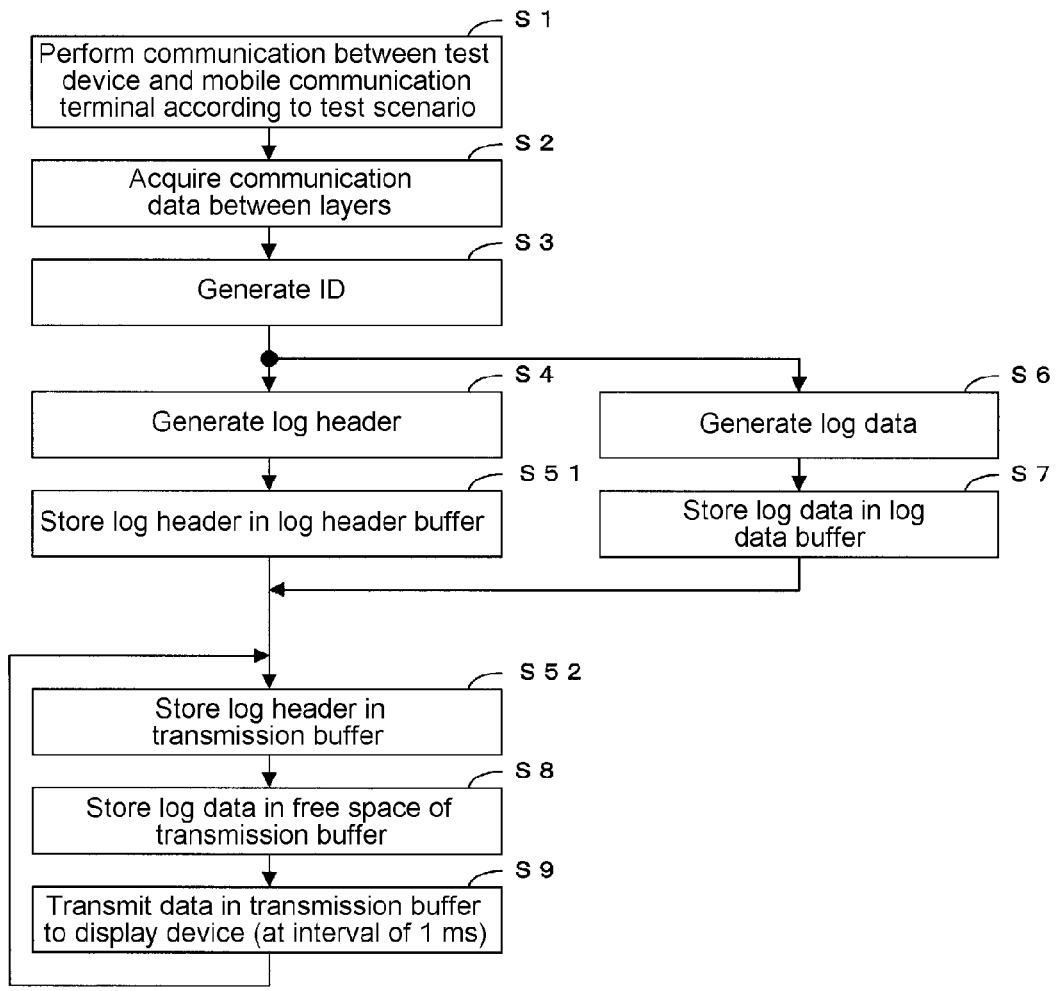
FIG. 10 is a flowchart illustrating the operation of a test device according to the second embodiment of the invention.

FIG. 10 is a flowchart illustrating the operation of the test device 10'. Here, the difference from the operation of the test device 10 according to the first embodiment shown in FIG. 6 will be described. The log header generated by the log header generating unit 151 is stored in the log header buffer 18 (S51).

Before transmission is performed, first, the priority control unit 19 stores the log header stored in the log header buffer 18 in the transmission buffer 171 (S52). Then, the priority control unit 19 stores the log data stored in the log data buffer 16 in the free space of the transmission buffer 171 (S8). Then, transmission is performed (S9).

As such, in the test system and the test method according to the invention, the log information which is divided into the log header and the log data is generated and the log header is preferentially transmitted. Therefore, it is possible to display the log using at least the log header information, as compared to a case in which the log information which cannot be transmitted is completely omitted. As a result, the tester can check the outline of communication and the convenience of the tester can be improved.

DESCRIPTION OF REFERENCE NUMERALS AND SIGNS 1, 1': TEST SYSTEM
2: MOBILE COMMUNICATION TERMINAL
10, 10': TEST DEVICE
11: TRANSMITTING AND RECEIVING UNIT
12: LAYER PROCESSING UNIT
13: MESSAGE PROCESSING UNIT
14: SCENARIO PROCESSING UNIT
15: LOG PROCESSING UNIT
16: LOG DATA BUFFER
17: TEST-DEVICE-SIDE TRANSMITTING UNIT
18: LOG HEADER BUFFER
19: PRIORITY CONTROL UNIT
30: DISPLAY DEVICE
31: DISPLAY-DEVICE-SIDE TRANSMITTING UNIT
32: LOG TYPE SORTING UNIT
33: LOG HEADER STORAGE UNIT
34: LOG DATA STORAGE UNIT
35: DISPLAY CONTROL UNIT
36: DISPLAY UNIT
37: OPERATION UNIT
151: LOG HEADER GENERATING UNIT
152: LOG DATA GENERATING UNIT
153: TIME GENERATING UNIT
154: ID GENERATING UNIT
171: TRANSMISSION BUFFER
351: LOG CORRESPONDENCE PROCESSING UNIT

What is claimed is:

1. A test system comprising:
a test device including a layer processing unit that performs processes corresponding to a plurality of layers for a message which is transmitted and received to and from a mobile communication terminal, which is a test target, according to a communication protocol including the plurality of layers, a log processing unit that acquires communication data for each layer from the layer processing unit and generates log information including the communication data, layer identification information for identifying a transmission source layer and a destination layer of the communication data, and time information indicating a time when the communication data is communicated, and a transmitting unit that transmits the log information to the outside; and a display device including a display unit and a display control unit that displays communication logs of the plurality of layers on the display unit on the basis of the log information received from the transmitting unit of the test device, wherein the log processing unit includes a log header generating unit that generates a log header including the layer identification information and the time information and a log data generating unit that generates log data including the communication data, and the log processing unit generates the log header and the log data as the log information, the test device further includes a priority control unit that performs control such that the transmitting unit transmits the log header prior to the log data, and the display control unit displays the log such that the log header is associated with the log data.

2. The test system according to claim 1, wherein the transmitting unit includes a transmission buffer that temporarily stores transmission target data and deletes the stored transmission target data whenever the transmission is performed, the test device further includes a log data buffer that temporarily stores the log data generated by the log data generating unit, and the priority control unit sequentially stores the log header generated by the log header generating unit in the transmission buffer and stores the log data stored in the log data buffer in a free space of the transmission buffer immediately before the transmission is performed.

3. The test system according to claim 1, wherein the transmitting unit includes a transmission buffer that temporarily stores transmission target data and deletes the stored transmission target data whenever the transmission is performed, the test device further includes a log header buffer that temporarily stores the log header generated by the log header generating unit and a log data buffer that temporarily stores the log data generated by the log data generating unit, and the priority control unit stores the log data stored in the log data buffer in a free space of the transmission buffer after storing the log header stored in the log header buffer in the transmission buffer.

4. The test system according to claim 1, wherein the log processing unit includes an ID generating unit that generates an identifier for identifying each log information item and outputs the same identifier to the log header generating unit and the log data generating unit, the log header generating unit generates the log header including the identifier, the log data generating unit generates the log data including the identifier, and the display control unit includes a log correspondence processing unit that associates the log header and the log data with the same identifier.

5. The test system according to claim 1, wherein a display screen displayed on the display unit includes a log header information display area in which information included in the log header is displayed as a log in time series and a communication data information display area in which the content of the communication data included in the log data is displayed, and when any one of the logs displayed in the log header information display area is designated, the display control unit displays the content of the communication data included in the log data corresponding to the designated log in the communication data information display area.

6. The test system according to claim 1, wherein, when the log header and the log data corresponding to each other are received from the transmitting unit of the test device, the display control unit displays the log such that the log header is associated with the log data, and when only the log header is received from the transmitting unit of the test device, the display control unit displays the log on the basis of information included in the log header.

7. A test method comprising:

a layer processing step of performing processes corresponding to a plurality of layers for a message which is transmitted and received to and from a mobile communication terminal, which is a test target, according to a communication protocol including the plurality of layers;

a log processing step of acquiring communication data for each layer which is processed in the layer processing step and generating log information including the communication data, layer identification information for identifying a transmission source layer and a destination layer of the communication data, and time information indicating a time when the communication data is communicated;

a transmitting step of transmitting the log information; and a display step of displaying communication logs of the plurality of layers on the basis of the transmitted log information, wherein the log processing step includes a log header generating step of generating a log header including the layer identification information and the time information and a log data generating step of generating log data including the communication data, and the log processing unit generates the log header and the log data as the log information, the transmitting step transmits the log header prior to the log data, and the display step displays the log such that the log header is associated with the log data.

8. The test method according to claim 7, wherein the transmitting step temporarily stores transmission target data in a transmission buffer and deletes the stored transmission target data whenever the transmission is performed, and the test method further includes:

a log header storage step of sequentially storing the log header generated in the log header generating step in the transmission buffer;

a first log data storage step of temporarily storing the log data generated in the log data generating step in a log data buffer; and a second log data storage step of storing the log data stored in the log data buffer in a free space of the transmission buffer immediately before the transmission is performed.

9. The test method according to claim 7,
wherein the transmitting step temporarily stores transmission target data in a transmission buffer and deletes the stored transmission target data whenever the transmission is performed, and the test method further includes:

a first log header storage step of storing the log header generated in the log header generating step in a log header buffer;

a first log data storage step of temporarily storing the log data generated in the log data generating step in a log data buffer;

a second log header storage step of storing the log header stored in the log header buffer in the transmission buffer; and a second log data storage step of storing the log data stored in the log data buffer in a free space of the transmission buffer after the second log header storage step.

10. The test method according to claim 7,
wherein the log processing step includes an ID generating step of generating an identifier which identifies each log information item and is the same in the log header generating step and the log data generating step, the log header generating step generates the log header including the identifier, the log data generating step generates the log data including the identifier, and the display step includes a log correspondence processing step of associating the log header and the log data with the same identifier.

11. The test method according to claim 7,
wherein a display screen displayed in the display step includes a log header information display area in which information included in the log header is displayed as a log in time series and a communication data information display area in which the content of the communication data included in the log data is displayed, and the display step includes a designation step of designating any one of the logs displayed in the log header information display area and a communication data information display step of displaying the content of the communication data included in the log data corresponding to the designated log in the communication data information display area.

12. The test method according to claim 7,
wherein, when the log header and the log data corresponding to each other are transmitted in the transmitting step, the display step displays the log such that the log header is associated with the log data, and when only the log header is transmitted in the transmitting step, the display step displays the log on the basis of information included in the log header.

13. A test device comprising:
a layer processing unit that performs processes corresponding to a plurality of layers for a message which is transmitted and received to and from a mobile communication terminal, which is a test target, according to a communication protocol including the plurality of layers;

a log processing unit that acquires communication data for each layer from the layer processing unit and generates log information including the communication data, layer identification information for identifying a transmission source layer and a destination layer of the communication data, and time information indicating a time when the communication data is communicated;

a transmitting unit that transmits the log information to a display device which displays communication logs of the plurality of layers on the basis of the log information; and a priority control unit, wherein the log processing unit includes a log header generating unit that generates a log header including the layer identification information and the time information and a log data generating unit that generates log data including the communication data, and the log processing unit generates the log header and the log data as the log information, and the priority control unit performs control such that the transmitting unit transmits the log header prior to the log data.

* * * * *